Figure 1:
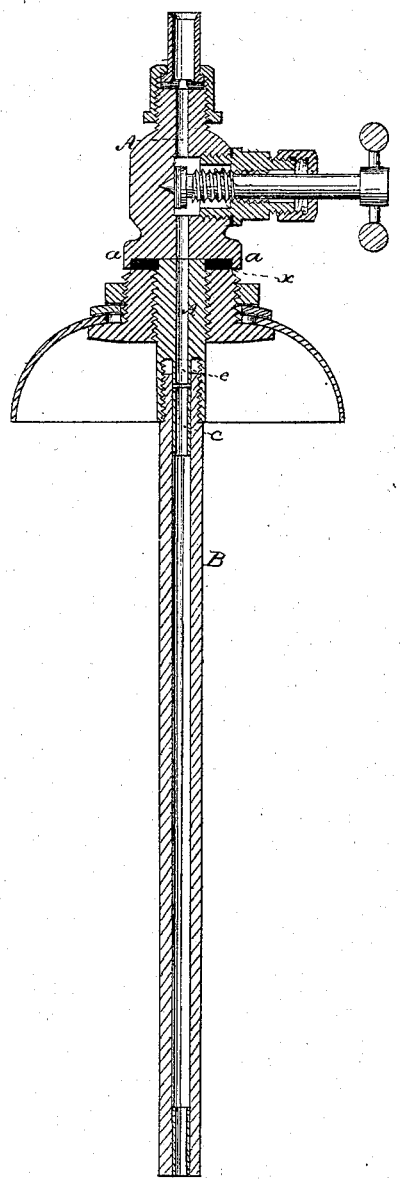

J. MATTHEWS.
Soda-Water Apparatus.

No. 137,702.                  Patented April 8, 1873.

Witnesses:
William H. Herbell
William Thos. Golden

Inventor:
John Matthews

UNITED STATES PATENT OFFICE.

JOHN MATTHEWS, OF NEW YORK, N. Y.

IMPROVEMENT IN SODA-WATER APPARATUS.

Specification forming part of Letters Patent No. 137,702, dated April 8, 1873; application filed March 21, 1873.

*To all whom it may concern:*

Be it known that I, JOHN MATTHEWS, of the city, county, and State of New York, have invented a new and useful Improvement in Soda-Water Fountains; and I do hereby declare the following to be a full and exact description of the same, reference being had to the accompanying drawing, which forms a part of this specification, and which is a vertical section of the same.

A A is a stop-cock with a projection of pure tin into the fountain. *a a* is the flange of the cock. *x x* is a packing of soft metal or other substance. *z z* is the lip of the bung-fountain. *e* is a nipple in the lower end of the cock projection. *c* is a ring or collar in the upper end of the elastic tube. B is an elastic tube. *d* is a ring or collar in the free extremity of the elastic tube.

The improvement relates, first, to a new method of closing the joint between the fountain and the stop-cock; second, to a new kind of pipe for the interior of the fountain; and third, to the method of securing the pipe to fountain-cock.

The first improvement is this: The flange *a a* of the cock, which beds down on the bung surmounting the fountain, is recessed so as to form a matrix to receive a soft metallic or other packing, *x x*. The lip *z z* of the bung of the fountain fits up into this recess, and impinges on the packing, which is prevented from spreading by the sides of the recess, and thus makes a perfect joint.

I have for some years used an annular packing in a recess in the fountain top, but that construction necessitates the removal of the fountain when the packing has to be replaced. It is much more convenient to have the packing in the flange of the stop-cock, as it is more portable than the fountain, and if alloys are used it is more convenient to send the stop-cock to have them replaced than the large fountain. I find this improvement effects a great saving in the gas usually wasted if the joint is not very perfect.

Secondly, I employ a tapering tube, B, of rubber or other elastic material, made sufficiently stiff to avoid collapse when the cock is opened, and insert into each end a short tube or collar of hard material, which, at the free end, may serve as a weight if the tube is not of sufficient weight to cause it to lie on the bottom of the fountain at all times. The stop-cock A A is provided with an extension of pure tin, having within it a projecting nipple, *e*, to enter the tube B, and impinge against the ring or collar *c* in the upper end thereof, when it is secured in its place. The elastic tube B is molded with a screw-thread on its exterior to fit the threads in the tin extension of the cock. The small tube or collar *c* inside the rubber tube B at this end, serves to keep the elastic tube into the threads of the screw in the tin extension. The extension, being of pure tin, cannot contaminate the water. The elastic tapering pipe B, by its flexibility, reaches the parts of the fountain which are lowest, and enables the fountain to be entirely emptied in any position. Being tapering the tube is more evenly flexed, so that it is not broken off near the cock by constant bending.

The tube is of rubber, weighted with ingredients incorporated in the rubber; but to avoid contamination the interior and exterior of this kind of tube is coated with pure Para gum, which prevents contamination of the beverage.

Having fully described my invention, what I claim, and desire to secure by Letters Patent, is—

1. The combination of a soft metallic or other packing, *x x*, in a recess in the flange of the stop-cock working against the lip *z z* on the bung of a soda-water fountain, as herein specified, so as to form a perfect joint between the cock and the fountain.

2. A tapering tube, B, formed of rubber or other elastic substance, with rings or collars in each end, either with or without weights, formed as herein specified, and for the purpose named.

3. The devices for securing the pipe or tube B to the cock A A consisting of threads on the exterior of the tube and the interior of the projection of the cock, in combination with the lip *e* and the collar or ring *c*, so as to form a joint between the cock and the pipe, as and for the purpose herein specified.

JOHN MATTHEWS.

Witnesses:
WILLIAM H. HERBELL,
WILLIAM T. GOLDEN.